May 2, 1961 E. W. LOHMAN 2,982,570
SECTIONAL DUCT TYPE WIREWAY CONSTRUCTION
Filed Feb. 4, 1959 2 Sheets-Sheet 1
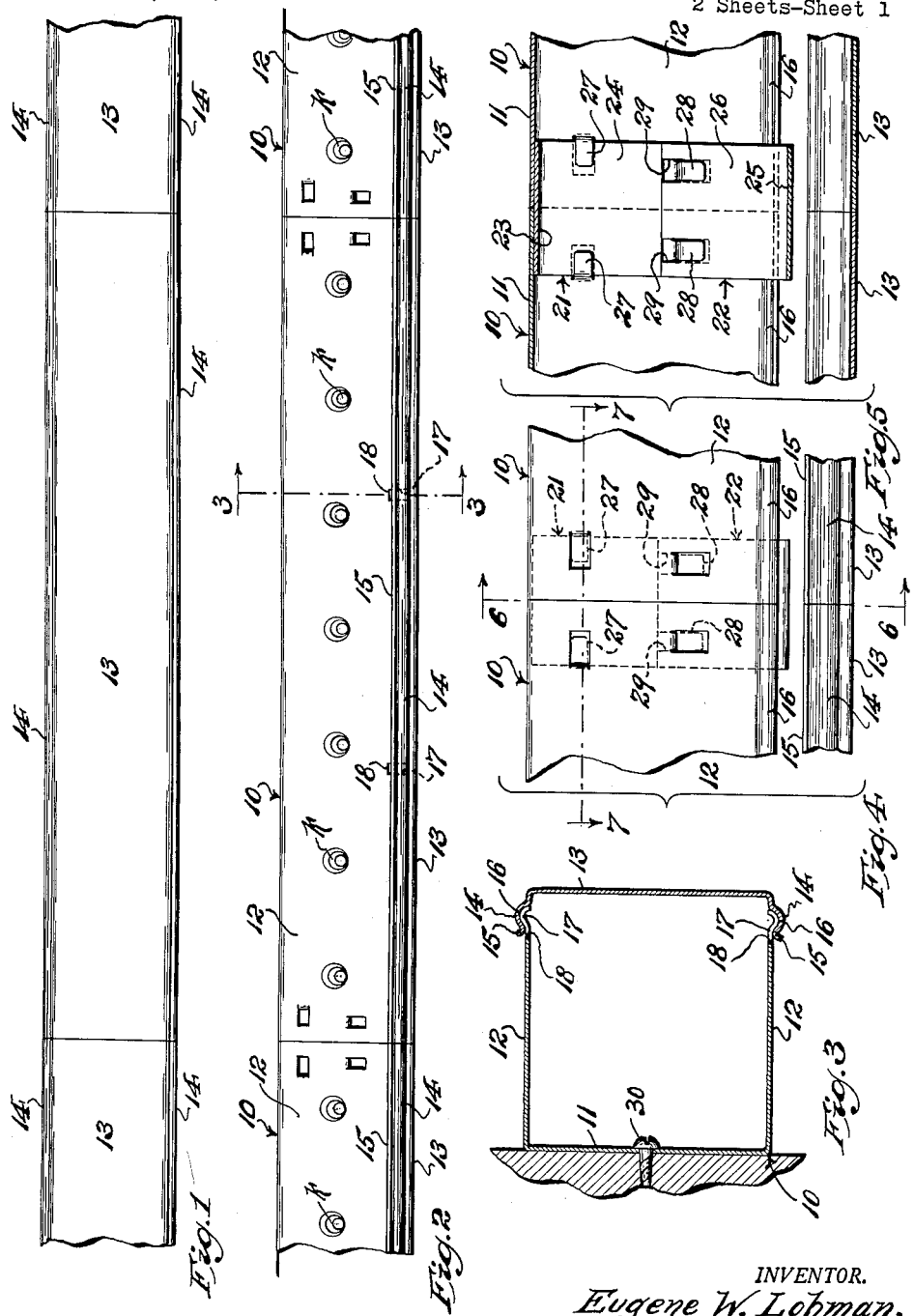
INVENTOR.
Eugene W. Lohman,
BY Richards & Cifelli,
Attorneys May 2, 1961  E. W. LOHMAN  2,982,570
SECTIONAL DUCT TYPE WIREWAY CONSTRUCTION
Filed Feb. 4, 1959  2 Sheets-Sheet 2

INVENTOR.
Eugene W. Lohman,
BY Richards & Cifelli,
Attorneys

United States Patent Office 2,982,570
Patented May 2, 1961

2,982,570

SECTIONAL DUCT TYPE WIREWAY CONSTRUCTION

Eugene W. Lohman, 405 Wychwood Road,
Westfield, N.J.

Filed Feb. 4, 1959, Ser. No. 791,194

2 Claims. (Cl. 285—397)

This invention relates to wireways or ducts for the reception of laid-in electrical current conductors from which operating current can be tapped off for service to various motor driven mechanisms or other electrically operated installations; and the invention has reference, more particularly, to wireway or duct construction of the sectional type, adjoining sections of which are adapted to be coupled together end to end, whereby to provide a continuous wireway.

This invention has for an object to provide a wireway or duct comprising an end to end assembly of open trough type sections having cover members to close the same; selected sections having, in one or more walls thereof, suitably located and spaced apart knockouts, selected removal of which provide openings giving access to the interiors of said sections for connection, with conductors installed therein, of current service branches adapted to extend to various places of use; novel coupling means being provided for connecting together adjoining sections, including means to interlock the coupling means in mutually attached relation to adjoining sections without necessity for use of applied separate fastener elements, such as screws, bolts, clasps, latches or the like.

Another object of this invention is to provide a wireway or duct construction as above characterized, including novel separable cover members to close the open trough type sections thereof.

The aforesaid and other objects will be understood from a reading of the following description of an illustrative embodiment of this invention in connection with the accompanying drawings, in which:

Fig. 1 is a fragmentary view of assembled adjoined sections of a wireway or duct according to this invention, viewed from the covered side thereof; and Fig. 2 is a side elevational view of the same.

Fig. 3 is a cross-sectional view, taken on line 3—3 in Fig. 2, but drawn on an enlarged scale.

Figure 6:
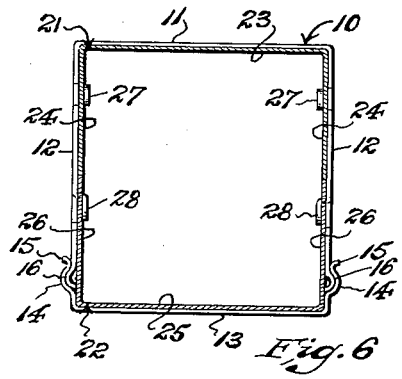
Figure 7:
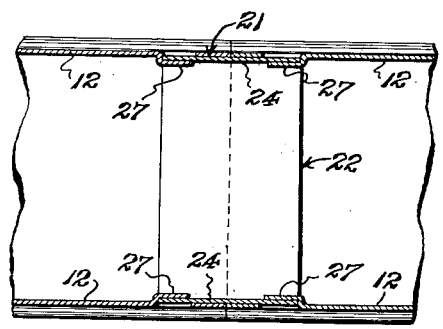

Fig. 4 is a fragmentary side elevational view of coupled together end portions of adjoining wireway or duct sections, drawn on an enlarged scale, showing two cover members thereof removed; Fig. 5 is a longitudinal sectional view through the coupled adjoining wireway or duct sections shown in Fig. 4; Fig. 6 is a cross-sectional view, taken on line 6—6 in Fig. 4; and Fig. 7 is a horizontal longitudinal sectional view, taken on line 7—7 in Fig. 4.

Figure 8:
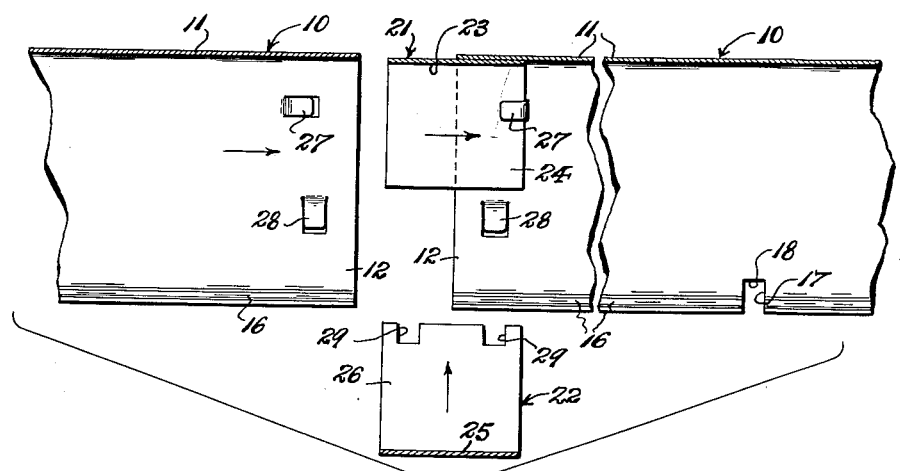

Fig. 8 is a longitudinal sectional view similar to that of Fig. 4, but showing opposed end portions of adjoining wireway or duct sections disassembled, but arranged to be connected by the coupling means according to this invention.

Figure 9:
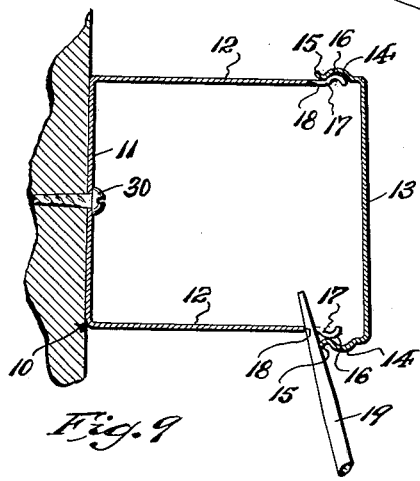

Fig. 9 is a view similar to that of Fig. 3 showing the method of detaching a cover member from a wireway or duct section.

Referring to the drawings, in which like characters of reference indicate corresponding parts, the reference character 10 indicates connectable body sections of a wireway or duct. These body sections are generally furnished in various lengths, e.g. in one, two, three, four and five foot lengths, whereby to accommodate the same for selective use according to need.

Each body section 10 comprises an open trough-like formation, usually produced from sheet metal, preferably of rectangular shape in cross-section, and formed by a bottom or back wall 11 and respective side walls 12. The open side of each body section 10 is adapted to be closed by a cover member.

One of the objects of this invention is to provide a removable cover member capable of snap on and off application to a body section. To this end, a cover member 13 is provided having longitudinally extending yieldable side flanges to engage over the free marginal portions of the side walls of a body section 10. Said side flanges of the cover member are respectively formed to provide longitudinally extending, inwardly open, concavo-convex ribs or beads 14, which terminate at their free edge portions in out-turned lips 15. These ribs or beads 14 constitute female fastener elements. The free marginal portions of the side walls 12 of the body section 10 are respectively formed to provide longitudinally extending, outwardly projecting, beads or ribs 16, which constitute male fastener elements over which the female fastener elements of the cover member 13 can be sprung, whereby to embrace the same and interlock therewith, thus securing the cover member in closing relation to the body section 10 (see Fig. 3).

To facilitate manipulation of a cover member 13 to remove the same from applied closing relation to a body section 10, the free marginal portions of at least one and preferably of both of the side walls 12 of the latter are provided with one or more suitably located indenting notches 17, which transversely intersect the male fastener element or elements provided by the beads or ribs 16. The closed ends 18 of said notches 17 are disposed inwardly of but adjacent to the lips 15 of the female fastener elements of the cover member 13, when said cover member occupies closing relation to the body section 10. Each notch 17 permits insertion therethrough of a suitable tool 19, e.g. a screw-driver, for engagement beneath a lip 15 of a female fastener element of the cover member, and so as to impinge the closed end 18 of said notch as a fulcrum about which the tool can be swung to exert snap off leverage upon the adjacent female fastener element relative to the engaged male fastener element, whereby to detach the cover member 13 from a body section 10 (see Fig. 9).

The improved means, according to this invention, for connecting together adjoining body sections of a wireway or duct in longitudinally aligned end to end relation comprises an inner coupling member 21 of inverted U-shape, preferably produced from sheet metal, and dimensioned to conform to the cross-sectional shape of the body section interior, and an outer coupling member 22 of U-shape, also preferably produced from sheet metal and shaped to fit within and across the open side of the body section interiors.

The inner coupling member 21 comprises a back wall 23 and respective side walls 24. Similarly, the outer coupling member 22 comprises a front wall 25 and respective side walls 26. Said inner and outer coupling members, when operatively assembled together, are adapted to be relatively disposed so that their open sides are opposed.

Struck inwardly from the respective side walls 12 of the respective opposed end portions of adjoining body sections 10, adjacent to the back walls 11 of the latter, are inwardly offset clip lugs 27. These clip lugs 27 extend horizontally, i.e. parallel to the longitudinal axes of the body sections 10, each being arranged to extend toward and being spaced from the body section end at a distance equivalent to one-half the length of the inner coupling member 21. Also inwardly struck from the respective side walls 12 of the respective opposed end portions of adjoining body sections 10, adjacent to the open sides of the latter, are inwardly offset clip lugs 28. These clip lugs 28 extend vertically, i.e. transverse to the longitudinal axes of the body sections 10, each being arranged to extend outwardly toward the open side of the body section, and being spaced from the body section end at a distance less than one-half the length of the outer coupling member 22. The respective free marginal end portions of the side walls 26 of the outer coupling member 22 are provided with indenting notches 29, corresponding in width to the width of said clip lugs 28, and spaced apart for alignment with the latter when opposed ends of adjoining body sections 10 are abutted.

The method of assembling the coupling members in connecting relation to and between opposed ends of adjoining body sections is illustrated in Fig. 8 of the accompanying drawings. In performing the assembling operations, the cover members 13 of said adjoining body sections are first removed. The inner coupling member 21 is then inserted endwise into an end portion of one body section 10, until an end of said inner coupling member engages beneath and abuts the clip lug 27 of said body section. As thus entered, the back wall 23 of the inner coupling member is disposed contiguous to the back wall 11 of said body section, and the side walls 24 are disposed contiguous to the side walls 12 of the latter. As thus initially disposed, one-half of the length of the inner coupling member 21 projects from the end of the body section 10 in which it is thus entered (see Fig. 8). The other body section 10 is now moved into end to end abutment with said first mentioned body section, thereby telescoping the same over the projecting end portions of the inner coupling member, until the clip lug 27 of said telescoping body section engages the latter. It will be observed that the opposed clip lugs 27 of the now abutted end portions of adjoining body sections 10, as engaged with opposite ends of the inner coupling member 21, retain this coupling member against longitudinal shift or displacement from its operative assembled relation to and between the abutting ends of the adjoining body sections (see Figs. 4, 5 and 7).

After the adjoining body sections and the inner coupling member 21 have been thus assembled, the outer coupling member 22 is passed inwardly through the open sides of said adjoined body sections, so as to be entered into the latter, and thereupon to engage the clip lugs 28 in the notches 29 thereof, and in lapping relation to the side walls 26 of said outer coupling member (see Figs. 4, 5 and 6). It will be observed that, as thus engaged by the clip lugs 28, the outer coupling member 22 interlocks with the opposed end portions of adjoining body sections 10, whereby to secure the latter in connected relation against accidental separation.

The inner and outer coupling members having been assembled in connecting relation to and between adjoining body sections 10, in the manner above described, the cover members 13 are applied to the respective body sections in closing relation thereto, thereby retaining the coupling members in place, while at the same time completing enclosure of the wireway or duct interiors.

From the above it will now be understood that the novel means for connecting together adjoining ends of body sections of a wireway or duct structure is self-contained, and requires no use of applied separate fastener elements, such as screws, bolts, clasps, latches or the like.

It will be understood that a completed wireway or duct can be supported at a place of use in any suitable manner already known to the art. It may be mounted on and along a wall, as by fastening screws 30 passed through the back walls 11 of the body sections 10 (see Figs. 3 and 9), or by hanger suspension (not shown), or in any other convenient or suitable manner.

Although the above description, for purposes of illustration, deals with end to end connection of straight body sections of a wireway or duct, it will nevertheless be understood that the novel coupling means of this invention can also be used and applied to and between such body sections and auxiliary sections such as elbows, cross pull and other boxes, T-fittings and the like.

As is customary with respect to wireways or ducts of the kind with which this invention deals, selected walls of the body sections thereof can be and ordinarily are provided with spaced knockouts K of any known or suitable form (see Fig. 2), selected removal of which will provide openings giving access to the interior of the wireway or duct for connection, with conductors laid therein, of current service branches desired to be extended to various places of use.

What is claimed is:

1. In a wireway structure provided by end to end connected outwardly open trough type sections, coupling means to connect opposed ends of adjoining sections in coupled together relation, said coupling means comprising an inverted U-shaped inner coupling member and an opposed U-shaped outer coupling member, said coupling members conformably fitting within and between opposed end portions of adjoining sections, side walls of said sections having inwardly offset horizontal clip lugs directed toward their ends and adapted to embrace and abut the sides of the inner coupling member, whereby to retain said inner coupling member against longitudinal displacement, the outer coupling member having notches indenting upper end margins of its sides, said side walls of the sections being further provided with inwardly offset vertical clip lugs directed toward the open sides of said sections and adapted to enter said notches and embrace the sides of the outer coupling member, whereby to interlock the outer coupling member and adjoining sections together against separation of the latter, and cover members to close the open sides of the sections.

2. In a wireway structure provided by end to end connected outwardly open trough type sections, coupling means to connect opposed ends of adjoining sections in coupled together relation, said coupling means comprising an inverted U-shaped inner coupling member and an opposed U-shaped outer coupling member, said coupling members conformably fitting within and between opposed end portions of adjoining sections, side walls of said sections having inwardly offset horizontal clip lugs directed toward their ends and adapted to embrace and abut the sides of the inner coupling member, whereby to retain said inner coupling member against longitudinal displacement, the outer coupling member having notches indenting upper end margins of its sides, said side walls of the sections being further provided with inwardly offset vertical clip lugs directed toward the open sides of said sections and adapted to enter said notches and embrace the sides of the outer coupling member, whereby to interlock the outer coupling member and adjoining sections together against separation of the latter, and cover members to close the open sides of the sections, said cover members having longitudinally extending yieldable side flanges said side flanges having female fastener elements, and the free marginal edge portions of the sides of the sections having cooperative male fastener elements over which said female fastener elements can engage by snap-on action, at least one side of each section having one or more notches intersecting a male fastener element for reception of a tool manipulatable to exert leverage upon the cover member whereby to separate engaged fastener elements for snap-off cover member removal.

References Cited in the file of this patent

UNITED STATES PATENTS

| | | |
|---|---|---|
| 642,923 | Rhind | Feb. 6, 1900 |
| 1,277,550 | Connell | Sept. 3, 1918 |
| 1,619,411 | Fink | Mar. 1, 1927 |
| 1,633,798 | Taylor | June 28, 1927 |
| 1,935,690 | Zack | Nov. 21, 1933 |
| 2,353,121 | Adam | July 11, 1944 |
| 2,498,753 | Deitsch | Feb. 28, 1950 |
| 2,757,946 | Weig | Aug. 7, 1956 |
| 2,935,343 | Ellis | May 3, 1960 |

FOREIGN PATENTS

| | | |
|---|---|---|
| 113,793 | Australia | Sept. 2, 1941 |
| 549,840 | Great Britain | Dec. 9, 1942 |
| 1,039,800 | Germany | Sept. 25, 1958 |